Aug. 18, 1953 W. WARE 2,649,337
ROLLER STRUCTURE
Filed June 8, 1949
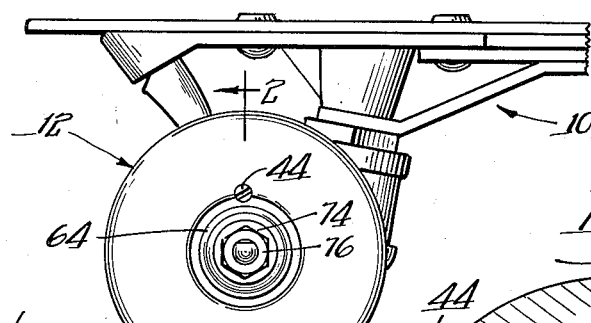
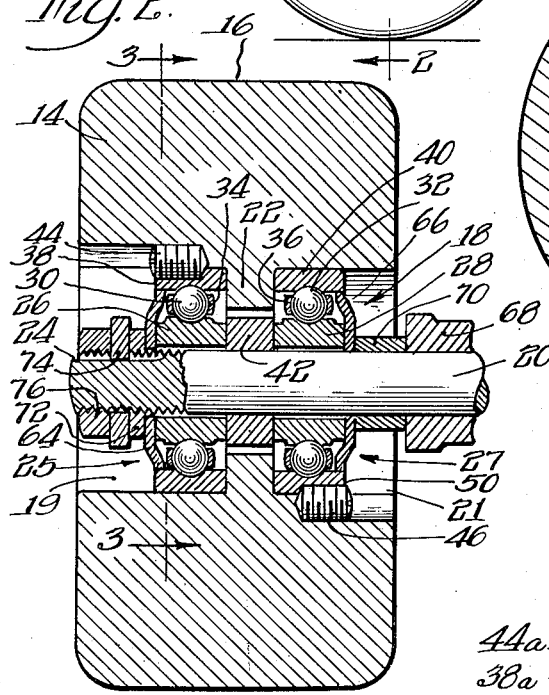

Patented Aug. 18, 1953

UNITED STATES PATENT OFFICE 2,649,337

2,649,337

ROLLER STRUCTURE

Walter Ware, Chicago, Ill., assignor to Chicago Roller Skate Company, Chicago, Ill., a corporation of Arizona Application June 8, 1949, Serial No. 97,858

5 Claims. (Cl. 301—5.7)

The present invention relates to a wheel structure, and more particularly to a roller or wheel of the type employed in roller skates, casters, conveyors, and like structures.

In rollers of the type set forth the roller tread and frequently the major portion of the roller body is made of wood, fibrous material, suitable plastic, or like materials when the roller is to be used in association with a wood or other relatively destructible floor. In such cases the roller is provided with a central bushing of relatively hard material such as metal which provides the necessary bearing surface between the roller structure and the supporting axle. Difficulties have been encountered in roller structures of the type described known heretofore in the art in securely and positively positioning and retaining the bushing within the roller. The material of which the roller is made also tends to shrink and otherwise deform whereby the bushing is loosened within the roller structure; the roller structures used heretofore did not provide means for tightening the bushing within the roller. Furthermore, in general the roller structures used heretofore often were constructed in such a manner that the bushing could not be readily removed from the body and reinserted in a new roller body. As a consequence the entire roller structure was of necessity discarded whenever the roller body became injured or broken.

The present invention contemplates providing a roller structure in which the bushing is retained and positioned in the roller by means of adjustable and removable fastening means.

It is an object of the present invention to provide an improved roller structure of the type described.

More specifically stated, it is an object of the invention to provide an improved roller structure in which the bushing is positively positioned and retained within the roller body.

Another object of the invention is to provide a new and improved roller of the type described wherein the central bushing may be tightened within the roller body to prevent relative separation under the influence of changes due to atmospheric conditions or strains normally encountered during use.

A further object of the invention is to provide a roller structure wherein the central bushing is fastened within the roller body in such a manner that the roller body may be easily replaced when worn or broken.

A still further object of the invention is to provide a roller structure of the type described which is economical in construction and which is more simply assembled and serviced.

Various other objects, advantages, and features of the invention will be apparent from the following specification when taken in connection with the accompanying drawings wherein certain preferred embodiments are set forth for purposes of illustration.

In the drawings, wherein like reference numerals refer to like parts throughout:

Figure 1 is a partial assembly view of a roller skate structure incorporating a roller constructed in accordance with and embodying the principles of the invention;

Figure 2 is an enlarged vertical cross sectional view of the roller illustrated in Figure 1 as seen in the direction of the arrows along the line 2—2 thereof;

Figure 3 is a partial cross sectional view of the structure of Figure 2 as seen in the direction of the arrows along the line 3—3 of Figure 2;

Figure 4 is an exploded view, in perspective, of a portion of the bushing and bearing assembly illustrated in Figures 1 through 3;

Figure 5 is a partial cross sectional view similar to Figure 2 showing another embodiment of the present invention;

Figure 6 is a top view of a preferred fastener member to be used with the present invention; and Figure 7 is a perspective view of the fastener member shown in Figure 6.

In the drawings the invention has been shown incorporated in a roller skate structure, a use in which it has particular advantage and utility. It is to be understood, however, that such a roller structure may be used to accomplish the above mentioned objects in various types of structures such, for example, as casters and conveyors wherein comparable operating problems are presented or wherein the characteristics of the roller structure of the present invention may be desired.

Referring more specifically to the drawings, in Figure 1 there is illustrated the forward portion of a roller skate generally designated by the numeral 10 and which includes a wheel or roller 12 which is constructed in accordance with the principles of the present invention. Referring to Figure 2, it is seen that the roller 12 comprises an annular body 14 preferably of wood, fiber, suitable plastic, or like material having a tread surface 16 and a central chamber 18 within which is disposed an axle 20 and other parts which are hereinafter described. The chamber 18 is divided into two portions 19 and 21 by a flange portion 22 which extends radially inwardly from the body member 14 into the chamber 18.

The axle 20 may be of any desirable type or kind and in the embodiment shown in Figure 2 has a D-shaped end section 24, the cross section of which is shown best in Figure 3. The axle 20 provides a support for a pair of bearing assemblies 25 and 27 which comprise ball races 26 and 28 upon which are positioned ball bearings generally indicated by the numerals 30 and 32, respectively. These ball bearings 30 and 32 are held in spaced relationship around the races 26 and 28 by cages 34 and 36, respectively. In addition to bearing against the ball races 26 and 28 the ball bearings bear against a pair of annular bushings 38 and 40 which have a groove formed on their inner circular surface to receive the balls 30 and 32.

The annular bushing 38 is positioned within the chamber 19 adjacent one side of the flange 22 and the annular bushing 40 is similarly positioned within the chamber 21 adjacent the other side of flange 22. The ball bearing assemblies 25 and 27 are separated by a spacing washer 42 which encircles the axle 20 and which contacts the races 26 and 28.

The bearing assemblies 25 and 27 which support the body member 14 upon the axle 20 are held in position within the body member by means of set screws 44 and 46, respectively. These set screws 44 and 46 engage slots 48 and 50, respectively, which are cut in the outer surface of the annular bushings 38 and 40, and are threadedly received by the body member 14 on the periphery of the central chamber 18. As can be seen best in Figure 3, set screw 44 positively prevents relative rotation between the annular bushing 38 and the body member 14. The set screw 46 performs the same function for the annular bushing 40.

A self-locking set screw which is a preferred type of set screw to be used with the present invention is shown in Figures 6 and 7. This set screw comprises generally a body portion 52 which has a slot 54 extending partially therethrough dividing the upper portion of the set screw into two complementary halves 56 and 58. As is best seen in Figure 6, the halves 56 and 58 are laterally displaced from one another whereby, as viewed in Figure 6, the lefthand portion 56 is displaced downwardly with respect to the righthand portion 58. It is seen that if the set screw is provided with righthanded threads it may be screwed into an appropriate aperture in the normal manner. If the set screw should tend to come out or unscrew the edges 60 and 62 of the cut halves 56 and 58 will tend to dig into the wood adjacent these points and prevent the inadvertent withdrawal of the set screw. Such a self-locking type of set screw has many advantages as will be apparent to those skilled in the art.

The bearing assemblies 25 and 27 are provided with dust caps 64 and 66, respectively, which fit within the annular opening in the annular bushings 38 and 40. The dust caps 64 and 66 are positioned on the outermost portions of the bearing assemblies whereby to prevent dust and dirt from entering the ball bearing assemblies.

One end of the axle 20 is positioned within an axle bearing 68 which is attached to the main body of the skate 10. A spacing washer 70 is positioned on the axle 20 between the axle bearing 68 and the dust cap 66 of the bearing assembly 27. The roller wheel 12 is kept in position on the axle 20 by a first lock nut 72 which is adapted to be screwed upon the D-shaped end 24 of axle 20. A D-washer 74 and a second lock nut 76 serve to insure that the roller 12 is securely fastened to the axle 20.

Figure 5 illustrates a second embodiment of the present invention in which the set screw 44a is shown placed in a position such that its axis is at an angle with respect to the axle 20a. The annular bushing 38a is correspondingly grooved to facilitate the locking action between the set screw and the bushing. This embodiment also insures that the bushing 38a is always securely fitted within the roller body 14a.

The roller structure of the present invention may be easily and readily assembled without the use of special tools or fixtures. The bearing assemblies 25 and 27 are firmly and positively held in position within the roller body yet the bearing assemblies may be removed for repairs or replacement or may be removed from a broken or worn roller body and placed in a new roller body. Should the roller body become warped or should shrink it is apparent that the bearing assemblies may be tightened within the roller body by means of the set screws. The roller structure of the present invention is economical in construction since most of the parts are of standard manufacture. It will be seen that the present invention provides a roller structure which fulfills all of the above named objects and which eliminates all of the described difficulties in the prior art.

It is obvious that various changes may be made in the particular embodiments set forth without departing from the spirit of the invention. The invention is accordingly not to be limited to the particular embodiments shown and described, but only as indicated in the following claims.

The invention is hereby claimed as follows:

1. A roller skate wheel comprising a body having a central aperture therein and a tread surface, a pair of bushings positioned within said aperture, the outwardly disposed sides of said bushings being spaced inwardly from the adjacent side of the body, a groove formed on the circumference of each of said bushings, and only one set screw positioned in the groove of each bushing and engaging the body to hold said bushings in position within said body, said grooves and the associated set screws being diagonally disposed and symmetrically arranged with respect to said aperture whereby to provide a balanced roller skate wheel.

2. A roller skate wheel structure as set forth in claim 1, wherein the set screw is of the self-locking type thereby preventing inadvertent retrograde movement of the set screw.

3. A roller skate wheel as set forth in claim 1, wherein the axes of the set screws and the grooves are inclined with respect to the axis of the body.

4. A roller skate wheel as claimed in claim 1, wherein the axes of the set screws and the grooves are parallel to the axis of the body.

5. A roller skate wheel as claimed in claim 1, wherein the body includes a central radial flange within the central aperture and against opposite sides of which a corresponding bushing is positioned.

WALTER WARE.

References Cited in the file of this patent

UNITED STATES PATENTS

| Number | Name | Date |
| --- | --- | --- |
| 337,922 | Brinton | Mar. 16, 1886 |
| 623,358 | Everett | Apr. 18, 1899 |
| 847,541 | Ayers | Mar. 19, 1907 |
| 876,836 | Plimpton | Jan. 14, 1908 |
| 1,187,271 | Davey | June 13, 1916 |
| 1,572,567 | Skorka | Feb. 9, 1926 |
| 1,603,529 | Faust | Oct. 19, 1926 |
| 1,737,360 | Disbro | Nov. 26, 1929 |
| 1,874,595 | Olson | Aug. 30, 1932 |
| 1,940,455 | Kilpela | Dec. 19, 1933 |
| 2,484,974 | Van Horn | Oct. 18, 1949 |
| 2,534,401 | Blaes | Dec. 19, 1950 |